United States Patent
Sun

(10) Patent No.: US 7,335,055 B2
(45) Date of Patent: Feb. 26, 2008

(54) POWER SUPPLY CONTROL APPARATUS

(75) Inventor: Ke Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,034

(22) Filed: Jun. 12, 2006

(65) Prior Publication Data

US 2007/0128926 A1  Jun. 7, 2007

(30) Foreign Application Priority Data

Oct. 13, 2005  (CN) .................... 2005 1 0100382

(51) Int. Cl.
*H01R 13/66* (2006.01)

(52) U.S. Cl. ..................................... 439/539

(58) Field of Classification Search ............... 439/535, 439/502, 214–215, 353; 340/687, 438, 635; 361/103, 114, 45; 323/323, 351
See application file for complete search history.

(56) References Cited

U.S. PATENT DOCUMENTS

| 5,633,575 | A | * | 5/1997 | Gali | 320/140 |
| 6,184,671 | B1 | | 2/2001 | Han et al. | |
| 6,188,584 | B1 | * | 2/2001 | Arai et al. | 363/16 |
| 6,746,161 | B2 | * | 6/2004 | Imamura | 385/88 |
| 6,807,036 | B2 | * | 10/2004 | Baldwin | 361/42 |
| 7,209,048 | B1 | * | 4/2007 | Pace et al. | 340/687 |
| 7,257,466 | B2 | * | 8/2007 | Kreiner | 700/292 |
| 2003/0038605 | A1 | * | 2/2003 | Koch | 318/445 |

\* cited by examiner

*Primary Examiner*—J. F. Duverne
(74) *Attorney, Agent, or Firm*—Wei Te Chung

(57) ABSTRACT

A control apparatus is provided for controlling a power supply. The apparatus includes a direct current (DC) transformer, a plug, a plurality of electrical outlets, a plurality of switches corresponding to the electrical outlets, a plurality of relays, a fuse, and a diode. Each of the relays correspondingly controls each of the switches. The plug is connected to an input terminal of the DC transformer. The plug is also connected to the electrical outlets via corresponding switches. An anode output terminal of the DC transformer is connected to a cathode of the diode and one end of each of the relays via the fuse. A cathode output terminal of the DC transformer is connected to an anode of the diode and another end of each of the relays.

17 Claims, 2 Drawing Sheets

POWER SUPPLY CONTROL APPARATUS

FIELD OF THE INVENTION

The present invention relates to an apparatus for controlling a power supply, and particularly to an apparatus which can efficiently protect a device receiving power therefrom.

DESCRIPTION OF RELATED ART

Generally speaking, when using or testing an electrical device such as a server, power supplies of the device need to switch between on and off frequently, and the typical method is to insert and pull out plugs of the power supplies directly. However, the main power for the power supplies may be unstable so as to damage some electronic components of the device.

What is desired, therefore, is to provide an apparatus which can efficiently protect a device receiving power therefrom.

SUMMARY OF THE INVENTION

In one preferred embodiment, a control apparatus is provided for controlling a power supply. The apparatus includes a direct current (DC) transformer, a plug, a plurality of electrical outlets, a plurality of switches corresponding to the electrical outlets, a plurality of relays, a fuse, and a diode. Each of the relays correspondingly controls each of the switches. The plug is connected to an input terminal of the DC transformer. The plug is also connected to the electrical outlets via corresponding switches. An anode output terminal of the DC transformer is connected to a cathode of the diode and one end of each of the relays via the fuse. A cathode output terminal of the DC transformer is connected to an anode of the diode and another end of each of the relays.

By adding the control apparatus between an electrical device such as a server and main power, when the main power is unstable and goes over a predetermined value, the fuse in the apparatus will be fused, thereby cutting off power to the electrical device.

Other advantages and novel features will become more apparent from the following detailed description when taken in conjunction with the accompanying drawings, in which:

DETAILED DESCRIPTION OF THE INVENTION

Figure 1:
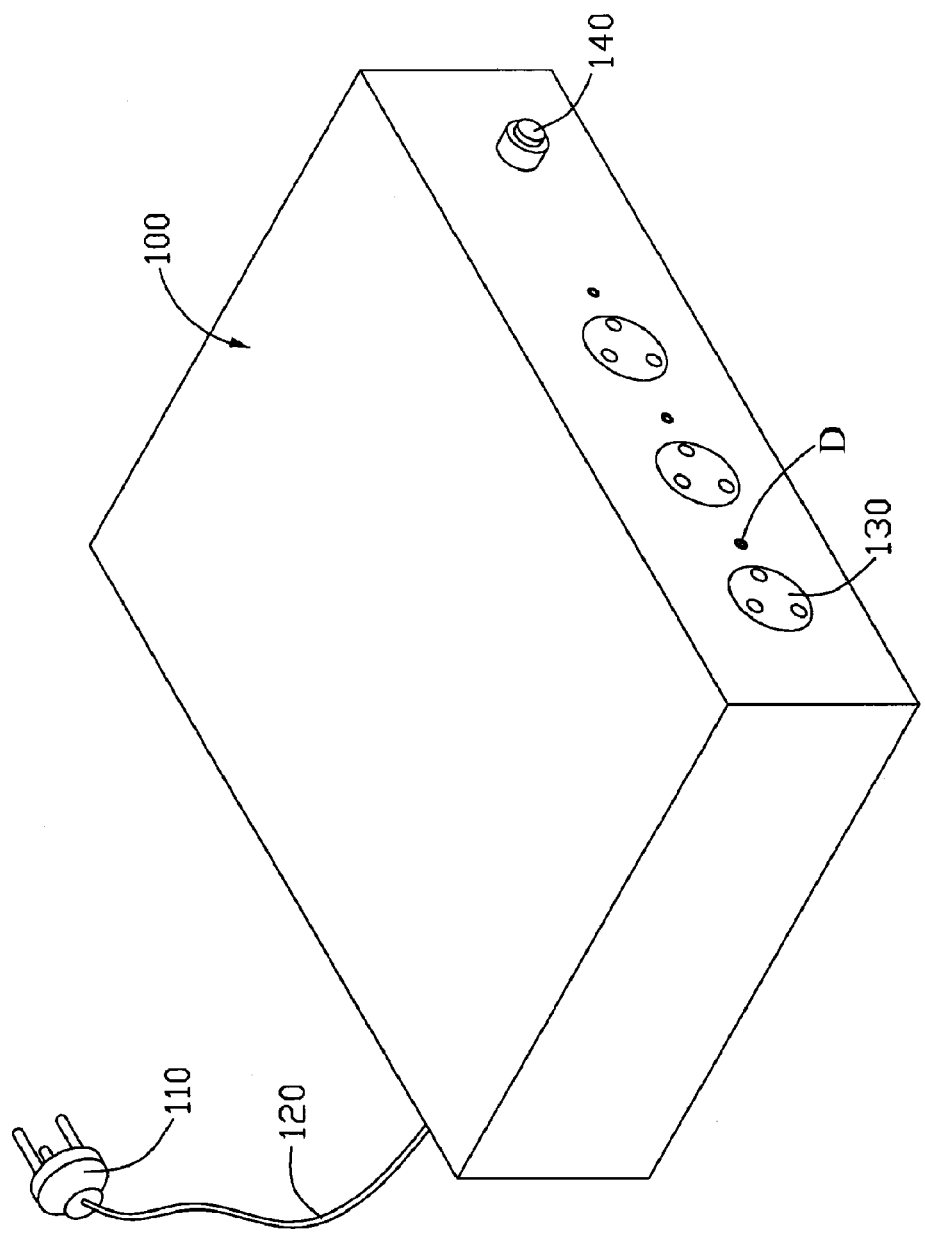
FIG. 1 is an isometric view of an apparatus in accordance with a preferred embodiment of the present invention.
Figure 2:
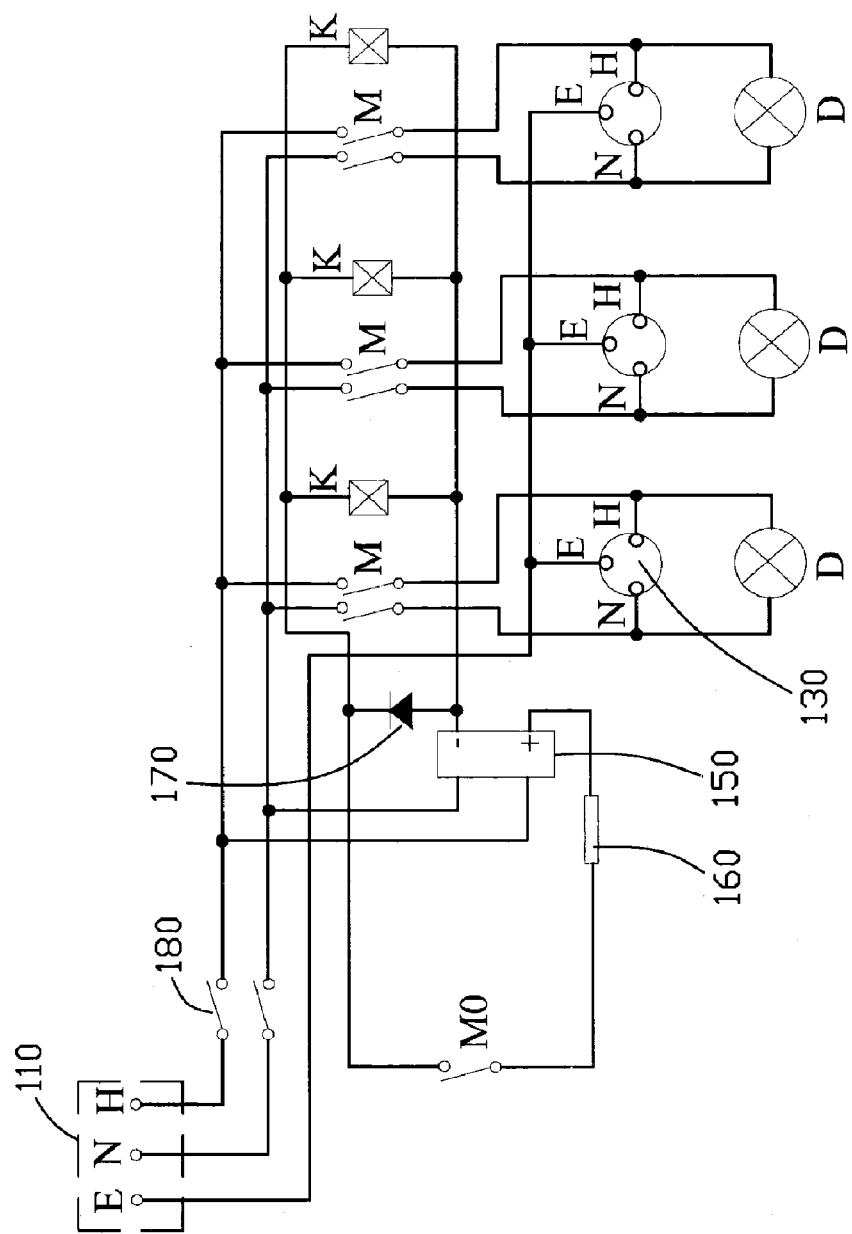
FIG. 2 is a circuit diagram of the apparatus of FIG. 1.

Referring to FIGS. 1 and 2, a control apparatus in accordance with a preferred embodiment of the present invention includes a box 100, a plug 110, and a power cable 120 for connecting the plug 110 to the box 100. A plurality of electrical outlets 130, a plurality of indicators D, such as light emitting diodes, each corresponding to one of the electrical outlets 130, and a button 140 are installed on an exterior of the box 100. A master switch M0, a direct current (DC) transformer 150, a fuse 160 for over-voltage protection, a diode 170, a plurality of switches M corresponding to the electrical outlets 130, a plurality of relays K corresponding to the switches M, and an air-switch 180 for over-current protection, are installed in the box 100. The button 140 controls the master switch M0, the master switch M0 also can be controlled by other conventional modes similar to the button 140. If the master switch M0 is open, then pushing the button 140 will close it. If the master switch M0 is closed then pushing the button 140 will open it.

In this embodiment, the master switch M0 is a single-pole single-throw (SPST) switch. The switches M are double-pole double-throw (DPDT) switches. Typically the plug 110 and the electrical outlets 130 each comprise an E terminal, an N terminal, and an H terminal, the three terminals are respectively for connecting a ground line, a neutral line, and a hot line.

The plug 110 is connected to an input terminal of the DC transformer 150. A cathode output terminal of the DC transformer 150 is connected to an anode of the diode 170 and one end of each of the relays K. An anode output terminal of the DC transformer 150 is connected to one end of the fuse 160. Another end of the fuse 160 is connected to a cathode of the diode 170 and another end of each of the relays K via the master switch M0. The plug 110 is also connected to the electrical outlets 130 via corresponding switches M. The plug 110 is also provided with the air-switch 180 in series for providing over-current protection. The master switch M0 controls the relays K, and each of the relays K controls the corresponding switch M. A reverse breakdown voltage of the diode 170 is in the range between a rated output voltage and an allowable maximum output voltage of the DC transformer 150. In this embodiment, each of the electrical outlets 130 is further connected to the corresponding indicator D for indicating the power on/off status of the electrical outlets 130.

When the control apparatus is working, the apparatus is connected to a main power (not shown) via the plug 110. Devices, such as a server (not shown) are connected to the electrical outlets 130. The number of electrical outlets 130 may be selected according to need. In this embodiment, there are three electrical outlets 130. When the button 140 is pushed the master switch M0 is closed, then the switches M are closed by the corresponding relays K, switching power to the electrical outlets 130 and turning on the indicators D, if the button 140 is pushed again the master switch M0 is opened, then the switches M are opened by the corresponding relays K, and power is switched off to the electrical outlets 130, and the indicators D are turned off.

When the electrical outlets 130 are in the power on status, if the main power becomes unstable causing an output voltage of the DC transformer 150 to be greater than the allowable maximum output voltage of the DC transformer 150, reverse break-down of the diode 170 will occur, thus causing the fuse 160 to fuse, thereby opening the switches M so that power to the electrical outlets 130 is cut off, and the indicators D turn off as well. If the current in the circuit of the apparatus is over the rated current, the air-switch 180 opens, cutting off power to the electrical outlets 130 and the indicators D, thereby efficiently protecting the device or devices.

It is believed that the present embodiments and its advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:
1. An apparatus for controlling power supply, comprising:
a direct current (DC) transformer;
a plug connected to an input terminal of the DC transformer;
a plurality of electrical outlets;
a plurality of switches corresponding to the electrical outlets, the plug connected to the electrical outlets via the corresponding switches;

a plurality of relays, each of the relays controlling a corresponding one of the switches;
a fuse; and
a diode, an anode output terminal of the DC transformer connected to a cathode of the diode and one end of each of the relays via the fuse, a cathode output terminal of the DC transformer connected to an anode of the diode and another end of each of the relays.

2. The apparatus as claimed in claim 1, further comprising an air-switch connected between the plug and the switches.

3. The apparatus as claimed in claim 1, further comprising a master switch connected between the cathode of the diode and the fuse.

4. The apparatus as claimed in claim 3, wherein the master switch is a single-pole single-throw (SPST) switch.

5. The apparatus as claimed in claim 1, wherein a reverse breakdown voltage of the diode is in the range between a rated output voltage and an allowable maximum output voltage of the DC transformer.

6. The apparatus as claimed in claim 1, wherein the switches are double-pole double-throw (DPDT) switches.

7. The apparatus as claimed in claim 1, wherein each of the electrical outlets is further connected to an indicator to indicate an on or off status of the outlets.

8. An apparatus for controlling power supply, comprising:
a direct current (DC) transformer;
a plug connected to an input terminal of the DC transformer;
a plurality of electrical outlets;
a plurality of switches corresponding to the electrical outlets, the plug connected to the electrical outlets via the corresponding switches;
a plurality of relays, each of the relays controlling a corresponding one of the switches, an anode output terminal of the DC transformer connected to one end of each of the relays, a cathode output terminal of the DC transformer connected to another end of each of the relays; and
an air-switch connected between the plug and the switches.

9. The apparatus as claimed in claim 8, further comprising:
a fuse connected between the anode output terminal of the DC transformer and one end of each of the relays; and
a diode connected between one end and another end of each of the relays.

10. The apparatus as claimed in claim 9, wherein a reverse breakdown voltage of the diode is in the range between a rated output voltage and an allowable maximum output voltage of the DC transformer.

11. The apparatus as claimed in claim 8, further comprising a master switch connected between the anode output terminal of the DC transformer and one end of each of the relays.

12. The apparatus as claimed in claim 11, wherein the master switch is a single-pole single-throw (SPST) switch.

13. The apparatus as claimed in claim 8, wherein the switches are double-pole double-throw (DPDT) switches.

14. The apparatus as claimed in claim 8, wherein each of the electrical outlets is further connected to an indicator for indicating an on or off status of the outlets.

15. An appartus for controlling power supply to electronic devices, comprising:
a box, and a plug for receiving a main power;
a plurality of electrical outlets mounted on the box for the electronic devices connecting thereto;
a plurality of switches corresponding to the electrical outlets,
a power cable connecting the plug to the electrical outlets via the corresponding switches;
a plurality of relays each controlling a corresponding one of the switches; and
an over-voltage protecting circuit connected to the plug and the relays, the over-voltage protecting circuit controlling the relays.

16. The appartus as claimed in claim 15, wherein the over-voltage protecting circuit comprises a direct current (DC) transformer, a fuse, and a diode, an input terminal of the DC transformer is connected to the plug, a cathode output terminal of the DC transformer is connected to an anode of the diode and one end of each of the relays, an anode output terminal of the DC transformer is connected to a cathode of the diode and another end of each of the relays via the fuse.

17. The appartus as claimed in claim 15, further comprising a plurality of indicators mounted on the box corresponding to the electrical outlets, each of the indicators connected to the corresponding electrical outlet.

* * * * *